US009922103B2

(12) United States Patent
Martens et al.

(10) Patent No.: US 9,922,103 B2
(45) Date of Patent: Mar. 20, 2018

(54) COPYING DATASETS BETWEEN DATA INTEGRATION SYSTEMS

(71) Applicant: Bank of America Corporation, Charlotte, NC (US)

(72) Inventors: Jason E. Martens, East Brunswick, NJ (US); Brad E. Romano, Furlong, PA (US); Sachin M. Nerurkar, Irvine, CA (US); Shashi Tanikella, North Brunswick, NJ (US)

(73) Assignee: Bank of America Corporation, Charlotte, NC (US)

( * ) Notice: Subject to any disclaimer, the term of this patent is extended or adjusted under 35 U.S.C. 154(b) by 537 days.

(21) Appl. No.: 14/519,359

(22) Filed: Oct. 21, 2014

(65) Prior Publication Data

US 2016/0110435 A1 Apr. 21, 2016

(51) Int. Cl.
*G06F 17/00* (2006.01)
*G06F 17/30* (2006.01)
*H04L 29/12* (2006.01)

(52) U.S. Cl.
CPC ...... *G06F 17/30563* (2013.01); *H04L 61/103* (2013.01); *H04L 61/1511* (2013.01)

(58) Field of Classification Search
USPC ........................................................ 707/602
See application file for complete search history.

(56) References Cited

U.S. PATENT DOCUMENTS

| 9,461,881 | B2 * | 10/2016 | Kumarasamy | .......... H04L 41/08 |
| 2007/0136324 | A1 * | 6/2007 | Xu | ..................... G06F 17/30563 |
| 2011/0055147 | A1 * | 3/2011 | Joerg | ..................... G06F 9/4843 707/602 |
| 2015/0052157 | A1 * | 2/2015 | Thompson | ........ G06F 17/30699 707/754 |

* cited by examiner

*Primary Examiner* — Mariela Reyes
*Assistant Examiner* — Mohsen Almani
(74) *Attorney, Agent, or Firm* — Michael A. Springs

(57) ABSTRACT

According to one embodiment, a method of copying a dataset associated with a first extract, transform, and load (ETL) job in a first data integration system to a second data integration system comprises copying executable code associated with the first ETL job from the first to the second system. Operating system software, integration system software, and file system structure are substantially identical between the first and second systems. The method further comprises executing the second ETL job to read the dataset from the first data integration system and write the dataset to the second data integration system. The second ETL job is associated with configuration parameters specifying storage resources in the first system associated with the dataset and destination parameters specifying storage resources in the second system. The method further comprises copying metadata generated by the second ETL job from the first to the second data integration system.

16 Claims, 4 Drawing Sheets

COPYING DATASETS BETWEEN DATA INTEGRATION SYSTEMS

TECHNICAL FIELD

This disclosure relates generally to data integration systems, and more particularly to copying datasets between data integration systems.

BACKGROUND

Data integration refers to the combination of data from one or more sources into a homogenous environment at a target destination. For example, a financial institution may combine data about financial transactions from multiple sources into a data warehouse. Extract, transform, and load (ETL) refers to a process that extracts data from one or more sources, transforms it to fit operational needs of an organization, and loads it into an end target, such as a database or data warehouse. Data integration systems, such as ETL systems, may process multiple terabytes of data using multiple servers with multiple processing units. To efficiently handle large amounts of data, data integration systems may implement parallel processing techniques, such as dividing a large dataset into smaller datasets and processing each of the smaller datasets in parallel.

A particular parallel processing technique, referred to as grid computing, takes advantage of a distributed network of general purpose computing nodes acting together to perform large tasks. A head node, also referred to as a conductor node, may control the scheduling and partitioning of jobs among the compute grid nodes. Compute grid nodes may process one or more smaller datasets in parallel with other compute grid nodes. In such a system, a complete dataset may be represented as a collection of smaller datasets stored at locations particular to the compute grid nodes processing each of the smaller datasets. The complete dataset may contain metadata indicating a location of the smaller datasets comprising the complete dataset.

A large ETL process may comprise several stages, with intermediate datasets created at each stage. Because a dataset in a traditional data integration system may contain metadata specific to resources within a particular data integration system, datasets created in one data integration system may not be readable by a second data integration system.

SUMMARY OF EXAMPLE EMBODIMENTS

In accordance with the present disclosure, disadvantages and problems associated with transferring datasets between data integration systems may be reduced or eliminated.

According to one embodiment of the present disclosure, a system comprises a first and second data integration system. The first data integration system comprises a first memory operable to store a first extract, transform, and load (ETL) job, a dataset associated with the first ETL job, and a second ETL job. The first data integration system also comprises a first processor communicably coupled to the first memory and the first processor is operable to process the first ETL job. The second data integration system comprises a second memory operable to store the first ETL job, the dataset associated with the first ETL job, and the second ETL job. The second data integration system also comprises a second processor communicably coupled to the second memory. The second processor is operable to process the first ETL job. A version of operating system software, a version of integration system software, and a file system structure are substantially identical between the first data integration system and the second data integration system. The first processor is further operable to copy executable code associated with the first ETL job from the first data integration system to the second data integration system and to execute the second ETL job to read the dataset from the first data integration system and write the dataset to the second data integration system. The second ETL job is associated with configuration parameters. The configuration parameters comprise source parameters specifying identifiers of storage resources in the first data integration system associated with the current storage location of the dataset and destination parameters specifying identifiers of storage resources in the second data integration system associated with a destination storage of the dataset. The first processor is further operable to copy metadata generated by the second ETL job from the first data integration system to the second data integration system.

According to some embodiments, the first data integration system comprises a first head node operable to coordinate parallel dataset processing among a first plurality of compute grid nodes. The second data integration system comprises a second head node operable to coordinate parallel dataset processing among a second plurality of compute grid nodes. The dataset comprises parallel processing metadata indicating storage resources associated with the first plurality of compute grid nodes and the source parameters identify storage resources associated with compute grid nodes in the first data integration system associated with the current storage location of the dataset.

According to another embodiment, a data integration system comprises a first head node and a second head node. The first head node comprises a first memory operable to store an extract, transform, and load (ETL) job and a first processor communicably coupled to the first memory and operable to process the ETL job. The second head node comprises a second memory operable to store the ETL job and a second processor communicably coupled to the second memory and operable to process the ETL job. The second head node comprises a version of operating system software, a version of integration system software, and a file system structure substantially identical to those of the first head node. A dataset is associated with the ETL job, wherein the dataset comprises user data and metadata. The metadata comprises virtual identifiers that identify resources of the data integration system associated with the dataset. The dataset is stored on a shared storage system shared between the first head node and the second head node. An identifier resolution server is operable to resolve the virtual identifiers to actual identifiers of resources associated with at least one of the first head node and the second head node. The first head node is operable to process the ETL job on the dataset when the identifier resolution server is configured to resolve virtual identifiers to actual identifiers of resources associated with the first head node. The second head node is operable to process the ETL job on the dataset when the identifier resolution server is configured to resolve virtual identifiers to actual identifiers of resources associated with the second head node.

According to some embodiments, the first head node is operable to coordinate parallel dataset processing among a plurality of compute grid nodes. The second head node is operable to coordinate parallel dataset processing among the plurality of compute grid nodes. The dataset associated with the ETL job comprises parallel processing metadata indicating storage resources associated with the plurality of compute grid nodes and a virtual head node identifier. The identifier resolution server is operable to resolve the virtual head node identifier to at least one of the first head node and the second head node according to a data integration system environment configuration.

Certain embodiments of the present disclosure may provide one or more technical advantages. For example, reading a dataset that was created by a different installation of a data integration system facilitates efficient copying of datasets between data integration systems without the need for reprocessing the dataset. For large datasets, this saves considerable time and computing resources. As another example advantage, a secondary data integration system may provide a backup or standby functionality to a primary data integration system. Maintenance or upgrade activity may be performed on the primary data integration system while the secondary data integration system continues to process the datasets created by the primary data integration system. Such functionality facilitates a data integration system that is highly available.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which.

DETAILED DESCRIPTION

Embodiments of the present disclosure and its advantages are best understood by referring to FIGS. 1-4, like numerals being used for like and corresponding parts of the various drawings.

Figure 1:
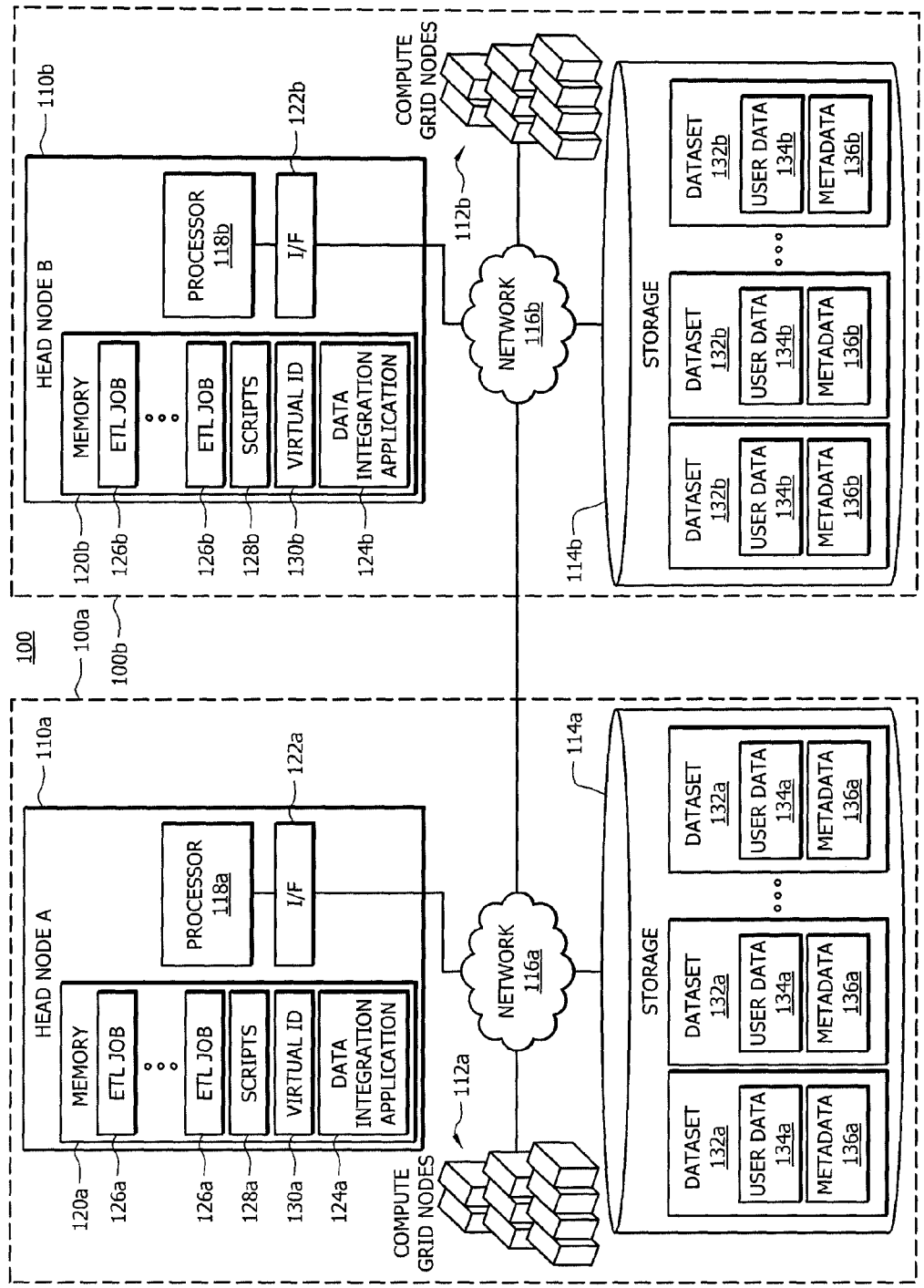
FIG. 1 illustrates a block diagram of example data integration systems, according to a particular embodiment.

FIG. 1 illustrates a block diagram of example data integration systems 100, according to a particular embodiment. Data integration system 100 may include head node 110, one or more compute grid nodes 112, storage 114, and network 116. Network 116 may communicably couple head node 110, compute grid nodes 112, and storage 114. In general, head node 110 coordinates the processing of data integration jobs among compute grid nodes 112. Compute grid nodes 112 may create datasets and store them using storage 114. Data integration jobs may include batch processing of data from one or more input sources, such as a customer transaction database, into a target destination, such as a data warehouse. In particular embodiments, data integration jobs may include extract, transform, and load (ETL) jobs.

Compute grid nodes 112 comprise a plurality of relatively low cost computer servers configured similarly and communicably coupled by network 116. In particular embodiments, compute grid nodes 112 may comprise personal computers (PCs), UNIX workstations, or any other computer server suitable for processing a data integration job, or a portion of a data integration job. In particular embodiments, head node 110 may divide a data integration job into multiple portions for processing in parallel. Head node 110 may assign one or more compute grid nodes 112 to each process a portion of a data integration job. As part of processing a data integration job, in particular embodiments, compute grid node 112 may store a dataset associated with the job. Compute grid node 112 may store a dataset using storage 114.

Storage 114 may refer to any suitable device capable of storing and facilitating retrieval of data and/or instructions. Examples of storage 114 include computer memory (e.g., Random Access Memory (RAM) or Read Only Memory (ROM)), mass storage media (e.g., a hard disk or a redundant array independent disks (RAID)), removable storage media (e.g., a Compact Disk (CD) or a Digital Video Disk (DVD)), database and/or network storage (e.g., a server, a network attached storage (NAS), or a storage area network (SAN)), and/or or any other volatile or non-volatile, non-transitory computer-readable memory devices that store one or more files, lists, tables, or other arrangements of information. In particular embodiments, storage 114 may be communicably coupled to network 116 and may store any data or datasets created by compute grid nodes 112 and/or head node 110. In particular embodiments, storage 114 may include local storage associated with compute grid nodes 112.

Network 116 may refer to any interconnecting system capable of transmitting signals, data, messages, or any combination of the preceding. In particular embodiments, network 116 may include all or a portion of a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In general, head node 110 coordinates the processing of data integration jobs. Head node 110 may include processor 118, memory 120, and interface 122. Head node 110 may refer to any suitable combination of hardware and/or software implemented in one or more modules to process data and provide the described functions and operations. In some embodiments, head node 110 may be a specialized node of compute grid nodes 112.

Memory 120 may refer to any suitable device capable of storing and facilitating retrieval of data and/or instructions. Examples of memory 120 include computer memory (e.g., RAM or ROM), mass storage media (e.g., a hard disk), removable storage media (e.g., a CD or a DVD), database and/or network storage (e.g., a server), and/or or any other volatile or non-volatile, non-transitory computer-readable memory devices that store one or more files, lists, tables, or other arrangements of information. Although FIG. 1 illustrates memory 120 as internal to head node 110, it should be understood that memory 120 may be internal or external to head node 110, depending on particular implementations. Also, memory 120 may be separate from or integral to other memory devices, such as storage 114, to achieve any suitable arrangement of memory devices for use in system 100.

Memory 120 is generally operable to store data integration application 124, one or more ETL jobs 126, one or more scripts 128, and one or more virtual identifiers 130. Data integration application 124 generally refers to logic, rules, algorithms, code, tables, and/or other suitable instructions for executing ETL jobs 126 on compute grid nodes 112. In some embodiments, data integration application 124 may coordinate parallel processing of ETL jobs 126 among multiple compute grid nodes 112. In some embodiments, data integration application 124 may include mechanisms, such as a job instruction language (JIL), for scheduling ETL jobs 126. In particular embodiments, data integration application 124 may include IBM InfoSphere Information Server™ applications, or similar data integration applications.

In general, ETL jobs 126 perform batch processing of data from one or more data sources to one or more target destinations. As an example of a particular embodiment, a financial institution may schedule an ETL job 126 to run at the end of each day that reads customer transaction data from multiple transaction databases, processes the transaction information into a common format, and stores the transaction information in a data warehouse. In particular embodiments, ETL job 126 may include IBM DataStage™ jobs.

In particular embodiments, ETL job 126 may perform processing in multiple phases. In particular embodiments, ETL job 126 may create one or more datasets 132 stored using storage 114.

As a particular example, a customer transaction processing ETL job 126 may collect data from multiple sources of transaction data to store in a data warehouse. After collecting transaction data from the multiple sources, customer transaction processing ETL job 126 may store the data in intermediate dataset 132. ETL job 126 may use dataset 132 for any number of reasons. In particular embodiments, different sources may make their transaction data available at different times, and ETL job 126 may store transaction information in dataset 132 until all sources have made their transaction data available. After dataset 132 includes transaction information from all sources, a subsequent phase of ETL job 126 may sort and remove duplicates from dataset 132. In particular embodiments, ETL job 126 may use dataset 132 to store transaction data until all parallel processing nodes have completed their processing before continuing on to the sort phase of the job.

In general, dataset 132 includes user data 134 and metadata 136. User data 134 refers to the data being processed by ETL job 126. Metadata 136 refers to data that describes user data 134. In particular embodiments, metadata 136 may identify head node 110 that created dataset 132.

In particular embodiments, user data 134 may be split into one or more portions and stored locally on one or more compute grid nodes 112. Metadata 136 may identify a location at compute grid node 112 where a portion of user data 134 may be located. In particular embodiments, metadata 136 may include any information that describes user data 134. In particular embodiments, metadata 136 may identify system 100 resources through the use of virtual identifiers 130.

In general, virtual identifier 130 identifies a resource of system 100. In particular embodiments, virtual identifier 130 may identify particular head node 110, particular compute grid nodes 112, a particular directory or file system path, or any other resource of system 100. Virtual identifiers 130 may include hostnames, IP addresses, directory or filenames, or any other type of identifier. Virtual identifier 130 is referred to as virtual because the actual resource identified may change. For example, a virtual IP address may resolve to a Media Access Control (MAC) address associated with a particular head node 110. If the particular head node 110 experiences trouble, data integration system 100 may be modified such that the virtual IP address resolves to a MAC address of a different head node 110.

In particular embodiments, virtual identifiers 130 may be associated with particular resources through environment variables, configuration files, or any other suitable mechanisms. For example, a configuration file may map virtual identifier 130, such as a hostname, to a particular IP address. An example of such a configuration file may be an /etc/hosts file commonly found on a UNIX workstation. Similarly, a Domain Name Server (DNS) may also associate a hostname with a particular IP address. As another example, triggering a refresh of an address resolution protocol (ARP) server may associate a virtual identifier 130, such as an IP address, with a different MAC address. In particular embodiments, virtual identifier 130, such as an environment variable, may point to a particular path on a file system where a particular file, database, or application resides. In general, any of the mechanisms described above for resolving a virtual identifier to a particular resource may be referred to as a virtual identifier resolution server.

In general, scripts 128 configure or modify a runtime environment of head node 110. In particular embodiments, scripts 128 may configure environment variables that identify particular resources of system 100. For example, script 128 may configure an environment variable that identifies a location of a particular installation of data integration application 124 for execution by processor 118. In particular embodiments, scripts 128 may modify an association of virtual identifiers 130 with system 100 resources. For example, script 128 may modify the contents of a configuration file that maps hostnames to IP addresses, script 128 may cause a DNS server to update DNS entries, or script 128 may trigger an ARP update to associate an IP address with a different MAC address. In particular embodiments, scripts 128 may copy information between head nodes 110 or other components of system 100. In particular embodiments, script 128 may copy security or session information between head nodes 110 or compute grid nodes 112. Script 128 may copy files associated with the status of ETL jobs 126 and data integration application 124 between head nodes 110.

In particular embodiments, scripts 128 may be run when a user or process connects to head node 110. In particular embodiments, scripts 128 may be run manually to reconfigure a runtime environment for head node 110 and/or compute grid nodes 112. In particular embodiments, scripts 128 may reconfigure a runtime environment for head node 110 and/or compute grid nodes 112 automatically upon detection of an event or condition. Examples of such manual and automatic configuration are discussed in more detail below.

Processor 118 is communicably coupled to memory 120. Processor 118 is generally operable to execute data integration application 124, ETL jobs 126, and scripts 128. Processor 118 may comprise any suitable combination of hardware and software to execute instructions and manipulate data to perform the described functions for head node 110. In some embodiments, processor 118 may include, for example, one or more computers, one or more central processing units (CPUs), one or more microprocessors, one or more applications, and/or other logic.

In some embodiments, interface 122 (I/F) is communicably coupled to processor 118 and may refer to any suitable device operable to receive input for head node 110, send output from head node 110, perform suitable processing of the input or output or both, communicate to other devices, or any combination of the preceding. Interface 122 may include appropriate hardware (e.g., modem, network interface card, etc.) and software, including protocol conversion and data processing capabilities, to communicate through network 116 or other communication system that allows head node 110 to communicate to other components of system 100. Interface 122 may include any suitable software operable to access data from various devices such as compute grid nodes 112, other head nodes 110, and/or storage 114. Interface 122 may include any suitable software operable to transmit data to various devices such as compute grid nodes 112, other head nodes 110, and/or storage 114. Interface 122 may include one or more ports, conversion software, or both. In general, interface 122 communicates data for the processing of ETL jobs 126 among compute grid nodes 112 and storage 114.

A component of system 100 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to the systems described herein without departing from the scope of the invention. For example, system 100 may include any number of head nodes 110, ETL jobs 126, scripts 128, virtual identifiers 130, compute grid nodes 112, networks 116, and/or storage 114. Particular components may be integrated or separated. Although components of data integration systems 100a and 100b are illustrated as separate components in FIG. 1, in some embodiments, data integration systems 100a and 100b may share one or more components. For example, networks 116a and 116b may both refer to a single network 116, compute grid nodes 112a and 112b may share some or all nodes between them, and storage 114a and 114b may share some or all storage resources. In particular embodiments, metadata 136 may be stored on different storage resources than user data 134. In particular embodiments, components of system 100, such as head nodes 110a and 110b, may be implemented on virtual machines. Moreover, the operations may be performed by more, fewer, or other components. Additionally, the operations may be performed using any suitable logic comprising software, hardware, and/or other logic. As used in this document, "each" refers to each member of a set or each member of a subset of a set.

Particular advantages may be realized by processing a dataset created by a first data integration system, such as data integration system 100a, in a second data integration system, such as data integration system 100b. As a particular example, a financial institution may maintain multiple data integration systems 100. The financial institution may maintain a development data integration system 100 for development of ETL jobs 126, a test data integration system 100 for testing ETL jobs 126, and a production data integration system 100 for executing ETL jobs 126 to process actual data, such as daily customer transaction data. If an error occurs processing ETL job 126 in production data integration system 100, a test engineer may benefit from copying dataset 132 associated with the error from production data integration system 100 to test integration system 100 where the test engineer can safely troubleshoot the error. Similarly, if the test engineer identifies a problem, a development engineer may benefit from copying dataset 132 from test data integration system 100 to development integration system 100 so that the development engineer may modify ETL job 126 to correctly process dataset 132.

Figure 2:
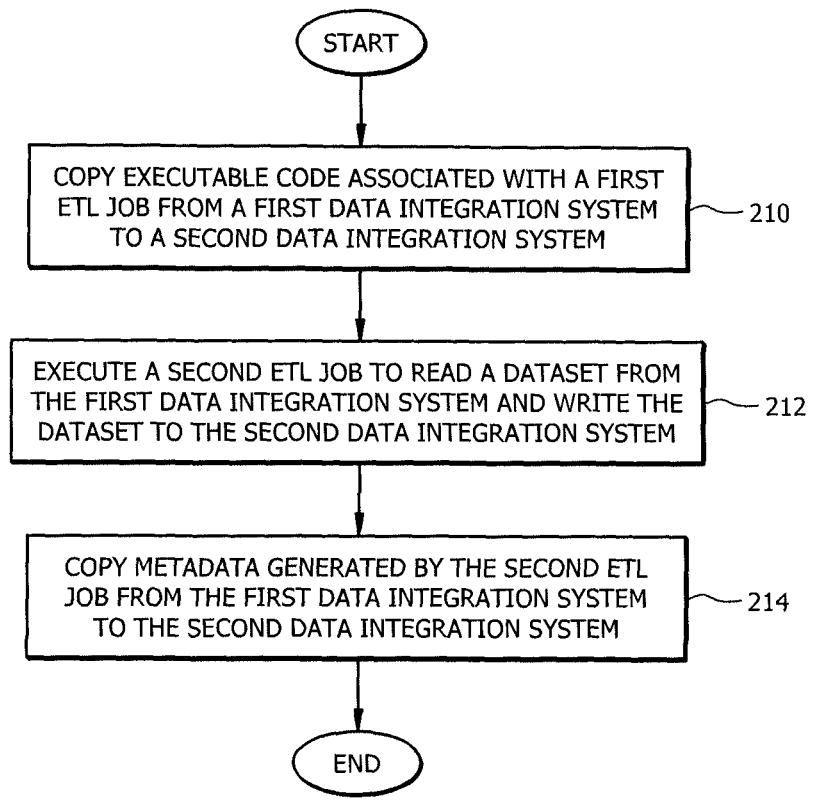
FIG. 2 illustrates a flowchart of an example method of copying a dataset from a first data integration system to a second data integration system, according to a particular embodiment.

FIG. 2 illustrates a flowchart of an example method 200 of copying a dataset from a first data integration system to a second data integration system, according to a particular embodiment. In particular embodiments, one or more steps of method 200 may be performed by components of data integration systems 100 of FIG. 1.

The method begins at step 210. At step 210, an administrator copies executable code associated with a first ETL job from a first data integration system to a second data integration system. For example, an administrator may copy executable code associated with a first ETL job 126 from head node 110a of data integration system 100a to head node 110b of data integration system 100b. In this example, data integration system 100a may be a production data integration system 100 and data integration system 100b may be a test data integration system 100. Dataset 132 may be associated with ETL job 126. In particular embodiments, an administrator may be any person with permission to access data integration systems 100a and 100b, and the copying may be performed manually or the administrator may cause another application or process to perform the copy.

In particular embodiments, data integration systems 100a and 100b are configured substantially identical. In particular embodiments, head nodes 110a and 110b and compute grid nodes 112a and 112b may share the same version of operating systems, respectively. In particular embodiments, data integration application 124a and 124b are the same version. In particular embodiments, the file systems used by head nodes 110a and 110b, compute grid nodes 112a and 112b, and storage 114a and 114b may share, at least in part, the same structure.

At step 212, a second ETL job is executed in the first data integration system that reads the dataset from the first data integration system and writes the dataset to the second data integration system. In particular embodiments, second ETL job 126 includes instructions to copy data from a source, in this example dataset 132 from data integration system 100a, to a target destination, in this example data integration system 100b. In particular embodiments, second ETL job 126 creates metadata 134 associated with dataset 132.

In particular embodiments, second ETL job 126 is associated with a configuration file that may include source parameters and destination parameters. The source parameters identify storage resources in data integration system 100a associated with the current location of dataset 132. For example, dataset 132 may contain metadata 134 indicating that portions of dataset 132 may be located on storage associated with particular compute grid nodes 112. The configuration file may include these storage resources as source parameters. The destination parameters may specify substantially equivalent resources in target data integration system 100b.

In particular embodiments, the configuration file associated with second ETL job 126 may be represented by the following example, which shows two source resources "Compute 1" and "Compute 2" and two destination resources "Compute 3" and "Compute 4."

```
{
    node "Conductor"
    {
        fastname "vipname.enterprise.com"
        pools "conductor"
        resource disk "/iis_prod_dataset1" {pools ""}
        resource scratchdisk "/tmp" {pools ""}
    }
    node "Compute1"
    {
        fastname "src_compute_node1.enterprise.com"
        pools "SRC" ""
            resource disk "/iis_prod_dataset1" {pools ""}
            resource disk "/iis_prod_dataset2" {pools ""}
            resource scratchdisk "/iis_scratch01" {pools ""}
            resource scratchdisk "/iis_scratch02" {pools ""}
    }
    node "Compute2"
    {
        fastname "src_compute_node2.enterprise.com "
        pools "SRC"
            resource disk "/iis_prod_dataset1" {pools ""}
            resource disk "/iis_prod_dataset2" {pools ""}
            resource scratchdisk "/iis_scratch01" {pools ""}
            resource scratchdisk "/iis_scratch02" {pools ""}
    }
    node "Compute3"
    {
        fastname "dst_compute_node1.enterprise.com "
        pools "TAR" ""
            resource disk "/iis_dataset1" {pools ""}
            resource disk "/iis_dataset2" {pools ""}
            resource scratchdisk "/iis_scratch01" {pools ""}
            resource scratchdisk "/iis_scratch02" {pools ""}
    }
    node "Compute4"
    {
        fastname " dst_compute_node2.enterprise.com "
        pools "TAR" ""
            resource disk "/iis_dataset1" {pools ""}
            resource disk "/iis_dataset2" {pools ""}
            resource scratchdisk "/iis_scratch01" {pools ""}
            resource scratchdisk "/iis_scratch02" {pools ""}
    }
}
```

In particular embodiments, the source parameters in the configuration file match the parameters associated with first ETL job 126 that created dataset 132. In particular embodiments, the configuration file may not contain private IP addresses or hostnames. The configuration file may contain resources identified by a DNS or a hostname configuration file. In particular embodiments, the configuration file contains a default pool for at least one of the source parameters and at least one of the destination parameters.

At step 214, the first data integration system copies metadata generated by the second ETL job to the second data integration system. For example, data integration system 100a may read dataset 132 and translate metadata 136, which is associated with dataset 132 and which identifies resources in data integration system 100a, to metadata 136 that identifies resources in data integration system 100b. The translation may be based on the source and destination parameters in the configuration file. Data integration system 100a may then copy both user data 134 and translated metadata 136 from data integration system 100a to data integration system 100b. In particular embodiments, data integration system 100b may now use its copy of first ETL job 126 to process dataset 132.

The steps of method 200 are given as example combinations of steps for copying a dataset from one data integration system to another. Some of the steps may be performed in a different order or repeated where appropriate. Additionally, one of skill in the art will recognize other combinations of steps are possible without departing from the scope of the present disclosure.

In particular embodiments, copying datasets between two data integration systems may have additional advantages. For example, such techniques may be used to implement a highly available data integration system. Occasionally a data integration system may need to enter a maintenance mode to perform software patches or upgrades, hardware upgrades or replacement, or other activity that might affect normal processing of ETL jobs. Traditionally, such activity may be performed during a maintenance window. A maintenance window may refer to a block of time without any scheduled ETL jobs. Increasingly, data integration systems are processing greater amounts of data each day. To process more data, data integration systems may be scheduled to run longer, which decreases any time available for maintenance activity. A highly available data integration system may include at least two head nodes, where one head node may execute ETL jobs while the other head node is in a maintenance mode.

Figure 3:
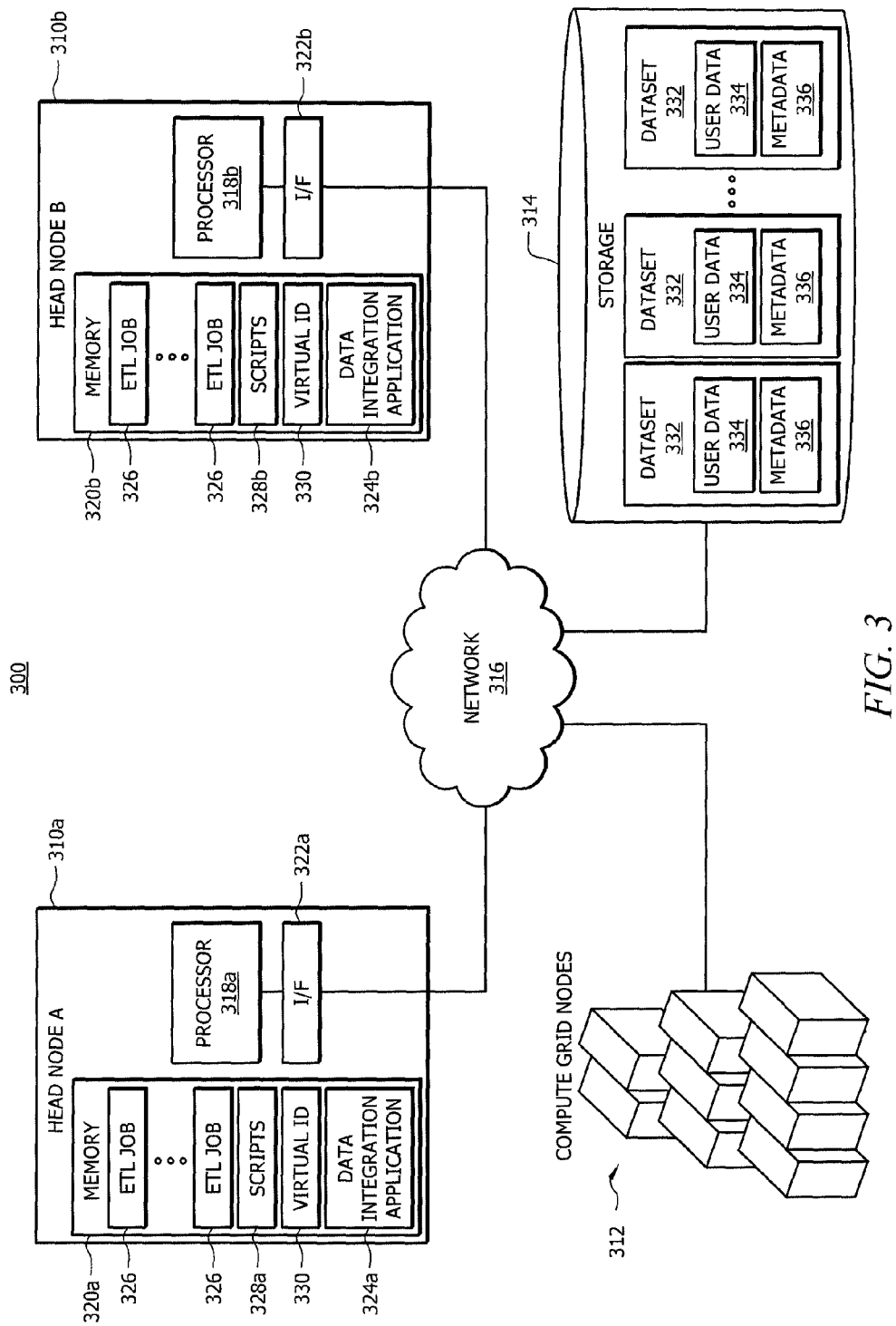
FIG. 3 illustrates a block diagram of an example data integration system including two head nodes, according to a particular embodiment.

FIG. 3 illustrates a block diagram of an example data integration system 300 including two head nodes, according to a particular embodiment. The components of data integration system 300 are similar to like numbered components of data integration systems 100 described in reference to FIG. 1.

As illustrated, data integration system 300 includes two head nodes 310a and 310b. In some embodiments, data integration system 300 may include a greater number of head nodes 310. For purposes of this example, head node 310a is a primary or active head node 310 that actively processes ETL jobs 326a. Head node 310b is a secondary or standby head node 310 that is synchronized with head node 310a and is available to process ETL jobs 326b if requested. In particular embodiments, a switchover from primary head node 310a to secondary head node 310b may be requested to perform maintenance on head node 310a. In particular embodiments, a switchover from primary head node 310a to secondary head node 310b may be performed automatically upon detection of an error condition associated with head node 310a. For example, head node 310b may automatically take over for head node 310a if head node 310a loses power.

In particular embodiments, head nodes 310a and 310b are configured with the same operating system release level, identical file systems, and they normally include identical but separate installations of data integration applications 324a and 324b. When maintenance is performed, however, a copy of data integration application 324a may be modified without affecting the installation of data integration application 324b.

In particular embodiments, a connection to head node 310a may automatically trigger execution of a script, such as script 328, that configures an environment variable to identify the runtime location of data integration application 324a. Similarly, a connection to head node 310b may automatically trigger execution of a script that configures an environment variable to identify the runtime location of data integration application 324b. In such a manner, users or applications connecting to either head node 310a or 310b may be unaware of the differences.

In particular embodiments, head node 310b includes ETL jobs 326b, which are identical to ETL jobs 326a of head node 310a. Head node 310b also includes copies of any runtime files needed to synchronize head nodes 310a and 310b such that head node 310b understands the state of any ETL jobs 326a run by head node 310a and may take over processing if requested. In particular embodiments, changes to head node 310a may be reflected on head node 310b in real time. In particular embodiments, ETL jobs, temporary files, JILs, log files, and/or any other synchronization information may be copied from head node 310a to 310b at the time of a switchover.

As discussed above, in particular embodiments ETL job 326 may be associated with dataset 332, which includes user data 334 and metadata 336. Metadata 336 includes identifiers of resources associated with user data 334, including identifiers of head nodes 310 and compute grid nodes 312. In particular embodiments, identifiers stored as part of metadata 336 are stored as virtual identifiers. For example, dataset 332 created by head node 310a may include metadata referencing head node 310a. The reference to head node 310a is by virtual identifier 330 associated with head node 310a. Upon switchover from head node 310a to 310b, a script, such as script 328a or 328b, may modify the runtime environment of data integration system 300 such that virtual identifier 330 identifies head node 310b. In this manner, head node 310b is able to read dataset 332 created by head node 310a.

Modifications, additions, or omissions may be made to the systems described herein without departing from the scope of the invention. For example, system 300 may include any number of head nodes 310 able to provide backup for primary head node 310. In particular embodiments, scripts 328 may copy session, login, or other security information between components of system 300 such that a user of system 300 is not required to re-enter security information after a switchover between head nodes 310. Particular components may be integrated or separated. Moreover, the operations may be performed by more, fewer, or other components. Additionally, the operations may be performed using any suitable logic comprising software, hardware, and/or other logic.

Figure 4:
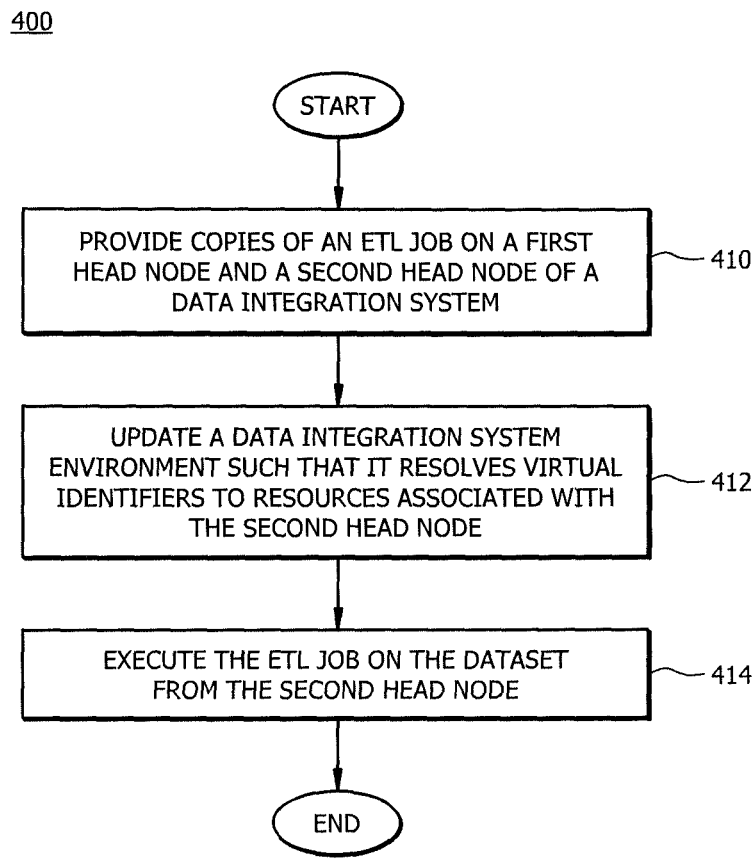
FIG. 4 illustrates a flowchart of an example method of switching a data integration system from a first head node to a second head node, according to a particular embodiment.

FIG. 4 illustrates a flowchart of an example method 400 of switching a data integration system from a first head node to a second head node, according to a particular embodiment. In particular embodiments, one or more steps of method 400 may be performed by components of data integration system 300 of FIG. 3.

The method begins at step 410. At step 410, an ETL job is copied from a first head node of a data integration system to a second head node of the data integration system and the ETL job is associated with a dataset. For example, data integration system 300 may copy ETL job 326 associated with dataset 332 from head node 310a to head node 310b. In particular embodiments, ETL job 326 may be copied at the time a switchover from head node 310a to 310b is requested. In particular embodiments, at the time ETL job 326 is installed or modified on head node 310a, it may also be installed or modified on head node 310b. In particular embodiments, step 410 may include any suitable method for providing copies of the ETL job on the first head node and the second head node.

In particular embodiments, a second ETL job 326 may be created, similar to the second ETL job described in method 200 above, that is configured to copy dataset 332 from head node 310a to 310b. In particular embodiments, the second ETL job may replicate user data 334 associated with dataset 332 to different storage associated with different compute grid nodes 312 (and update metadata 336 accordingly). In particular embodiments, because head node 310a and 310b share the same storage 314, dataset 332 may not be copied at all.

At step 412, the data integration system updates its runtime environment such that it resolves virtual identifiers to resources associated with the second head node. For example, in particular embodiments head node 310b may execute scripts 328b that update virtual identifiers 330 to resolve to resources associated with head node 310b. As a particular example, prior to switchover, a virtual IP address may resolve to head node 310a. After switchover, the same virtual IP address may resolve to head node 310b. In particular embodiments, scripts 328b may update the runtime environment of data integration system 300 by modifying environment variables, modifying configuration files, updating DNS entries, or any other suitable mechanism for modifying virtual identifiers.

At step 414, the data integration system executes the ETL job on the dataset from the second head node. For example, after data integration system 300 updates its runtime environment so that the virtual identifiers 330 resolve to resources associated with head node 310b, metadata 336 associated with dataset 332 identifies resources associated with head node 310b. Head node 310b is able to read and process dataset 332. In particular embodiments, dataset 332 is not modified in any way as part of the switchover.

The steps of method 400 are given as example combinations of steps for switching between head nodes of a data integration system. Some steps may be performed in a different order or repeated where appropriate. Additionally, one of skill in the art will recognize other combinations of steps are possible without departing from the scope of the present disclosure. For example, although the switchover is described in relation to a single ETL job, method 400 may be repeated or modified to switchover any number of ETL jobs and datasets between head nodes. As another example, in particular embodiments primary head node 310a may be modified while secondary head node 310b is processing ETL jobs. After head node 310a is modified, data integration system 300 may switch back to head node 310a. In particular embodiments, data integration system 300 may then modify head node 310b to match head node 310a. While method 400 describes copying datasets between head nodes of the same data integration system, particular embodiments may combine steps of method 200 and method 400 to copy datasets between head nodes of different data integration systems.

Certain embodiments of the present disclosure may provide one or more technical advantages. For example, datasets may be migrated between data integration systems quickly and efficiently without reprocessing source data. Another advantage of the current disclosure is that a highly available data integration system may provide data integration services with little or no down time.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A system comprising:
   a first data integration system comprising a first head node configured to coordinate parallel dataset processing among a first plurality of compute grid nodes, the first head node comprising:

a first memory configured to store a first extract, transform, and load (ETL) job, a dataset associated with the first ETL job, and a second ETL job; and a first processor communicably coupled to the first memory, the first processor configured to process, at least partially, the first ETL job to create the dataset associated with the first ETL job;

a second data integration system comprising a second head node configured to coordinate parallel dataset processing among a second plurality of compute grid nodes, the second head node comprising:

a second memory configured to store a copy of the first ETL job and a copy of the dataset associated with the first ETL job;

a second processor communicably coupled to the second memory, the second processor configured to process the copy of the first ETL job to continue processing the copy of the dataset in the second data integration system; and wherein:

a version of operating system software, a version of integration system software, and a file system structure are identical between the first data integration system and the second data integration system; and the first dataset comprises parallel processing metadata indicating storage resources associated with the first plurality of compute grid nodes;

the first processor further configured to:

copy the first ETL job from the first data integration system to the second data integration system;

execute the second ETL job to read the dataset from the first data integration system and write the dataset to the second data integration system, the second ETL is associated with configuration parameters comprising:

source parameters specifying identifiers of storage resources associated with compute grid nodes in the first data integration system associated with the current storage location of the dataset; and destination parameters specifying identifiers of storage resources associated with compute grid nodes in the second data integration system associated with a destination storage of the dataset; and copy metadata generated by the second ETL job from the first data integration system to the second data integration system.

2. The system of claim 1, wherein the second ETL job is configured to translate the parallel processing metadata indicating storage resources associated with the first plurality of compute grid nodes to parallel processing metadata indicating storage resources associated with the second plurality of compute grid nodes.

3. The system of claim 1, wherein the identifiers of storage resources are resolvable by a domain name server (DNS).

4. The system of claim 1, wherein:

the first data integration system comprises a test data integration system for testing ETL jobs; and the second data integration system comprises a development data integration system for developing ETL jobs.

5. The system of claim 1, wherein:

the first data integration system comprises a production data integration system; and the second data integration system comprises a test data integration system for testing ETL jobs.

6. A system comprising:

a first data integration system comprising a first head node configured to coordinate parallel dataset processing among a first plurality of compute grid nodes, the first head node comprising:

a first memory configured to store a first extract, transform, and load (ETL) job and a dataset associated with the first ETL job; and a first processor communicably coupled to the first memory, the first processor configured to process, at least partially, the first ETL job to create the dataset associated with the first ETL job;

a second data integration system comprising a second head node configured to coordinate parallel dataset processing among a second plurality of compute grid nodes, the second head node comprising:

a second memory configured to store a copy of the first ETL job and a copy of the dataset associated with the first ETL job;

a second processor communicably coupled to the second memory, the second processor configured to process the copy of the first ETL job to continue processing the copy of the dataset in the second data integration system; and wherein a version of operating system software, a version of integration system software, and a file system structure are identical between the first data integration system and the second data integration system;

a shared storage system shared between the first data integration system and the second data integration system;

the dataset is stored on the shared storage system and comprises user data and metadata, wherein the metadata comprises virtual identifiers that identify data system integration resources associated with the first plurality of compute grid nodes used to create the dataset;

the first processor is further configured to resolve the virtual identifiers to particular resources in the first data integration system; and the second processor is further configured to resolve the virtual identifiers to particular resources in the second data integration system.

7. The system of claim 6 wherein:

the first data integration system writes the dataset; and the second data integration system reads the dataset.

8. A method of copying a dataset associated with a first extract, transform, and load (ETL) job in a first data integration system comprising a first head node configured to coordinate parallel dataset processing among a first plurality of compute grid nodes to a second data integration system comprising a second head node configured to coordinate parallel dataset processing among a second plurality of compute grid nodes, the method comprising:

executing, by the first head node, at least part of the first ETL job to generate the dataset in the first data integration system;

copying executable code associated with the first ETL job from the first data integration system to the second data integration system, wherein a version of operating system software, a version of integration system software, and a file system structure are identical between the first data integration system and the second data integration system;

executing a second ETL job to read the dataset from the first data integration system and write the dataset to the second data integration system, wherein:
 the dataset comprises parallel processing metadata indicating storage resources associated with the first plurality of compute grid nodes;
 the second ETL job is associated with configuration parameters comprising:
  source parameters specifying identifiers of storage resources associated with compute grid nodes in the first data integration system associated with the current storage location of the dataset; and
  destination parameters specifying identifiers of storage resources associated with compute grid nodes in the second data integration system associated with a destination storage of the dataset;
 copying metadata generated by the second ETL job from the first data integration system to the second data integration system; and
 executing, by the second head node, at least part of the first ETL job to continue processing the dataset in the second data integration system.

9. The method of claim 8 further comprising translating, by the second ETL job, the parallel processing metadata indicating storage resources associated with the first plurality of compute grid nodes to parallel processing metadata indicating storage resources associated with the second plurality of compute grid nodes.

10. The method of claim 8 wherein:
 the identifiers of storage resources are resolvable by a domain name server (DNS).

11. The method of claim 8 wherein:
 the first data integration system comprises a test data integration system for testing ETL jobs; and
 the second data integration system comprises a development data integration system for developing ETL jobs.

12. The method of claim 8 wherein:
 the first data integration system comprises a production data integration system; and
 the second data integration system comprises a test data integration system for testing ETL jobs.

13. The method of claim 8 wherein the dataset is stored on a shared storage system shared between the first data integration system and the second data integration system.

14. The method of claim 8 wherein the dataset comprises user data and metadata, and wherein the metadata comprises virtual identifiers that identify data system integration resources used to create the dataset, and the method further comprising resolving, by the first data integration system, the virtual identifiers to particular resources in the first data integration system.

15. The method of claim 14 the method further comprising resolving, by the second data integration system, the virtual identifiers to particular resources in the second data integration system.

16. The method of claim 15 the method further comprising writing, by the first data integration system, the dataset and reading, by the second data integration system the dataset without executing the second ETL job and without copying the metadata.

\* \* \* \* \*